United States Patent
Sinha

(10) Patent No.: US 8,710,968 B2
(45) Date of Patent: Apr. 29, 2014

(54) SYSTEM AND METHOD FOR OUTPUTTING VIRTUAL TEXTURES IN ELECTRONIC DEVICES

(75) Inventor: Siddharth Sinha, Schaumburg, IL (US)

(73) Assignee: Motorola Mobility LLC, Chicago, IL (US)

( * ) Notice: Subject to any disclaimer, the term of this patent is extended or adjusted under 35 U.S.C. 154(b) by 596 days.

(21) Appl. No.: 12/900,186

(22) Filed: Oct. 7, 2010

(65) Prior Publication Data
US 2012/0086564 A1 Apr. 12, 2012

(51) Int. Cl.
*H04B 3/36* (2006.01)
(52) U.S. Cl.
USPC .................................. 340/407.2; 340/691.2
(58) Field of Classification Search
USPC .................. 340/407.2, 407.1, 691.2; 345/173
See application file for complete search history.

(56) References Cited

U.S. PATENT DOCUMENTS

| | | | |
|---|---|---|---|
| 7,225,115 B2 | 5/2007 | Jones | |
| 7,290,451 B2 | 11/2007 | Taniguchi et al. | |
| 7,319,466 B1 | 1/2008 | Tarr et al. | |
| RE40,808 E | 6/2009 | Shahoian et al. | |
| 7,548,232 B2 | 6/2009 | Shahoian et al. | |
| 2006/0238490 A1 | 10/2006 | Stanley et al. | |
| 2007/0005790 A1 | 1/2007 | Chang et al. | |
| 2008/0129705 A1* | 6/2008 | Kim et al. | 345/174 |
| 2010/0231367 A1 | 9/2010 | Cruz-Hernandez et al. | |
| 2010/0231508 A1 | 9/2010 | Cruz-Hernandez et al. | |
| 2010/0231539 A1 | 9/2010 | Cruz-Hernandez et al. | |
| 2010/0231540 A1 | 9/2010 | Cruz-Hernandez et al. | |
| 2010/0231541 A1 | 9/2010 | Cruz-Hernandez et al. | |
| 2010/0231550 A1 | 9/2010 | Cruz-Hernandez et al. | |
| 2012/0056825 A1* | 3/2012 | Ramsay et al. | 345/173 |

FOREIGN PATENT DOCUMENTS

WO 2008063700 A2 5/2008

OTHER PUBLICATIONS

Summers, Ian; Tactile Aids for the Hearing Impaired; John Wiley & Sons, Chapter 1, Whurr Publishers Ltd., London, Feb. 1992; 40 pages. (see pages 5-15).
German, Kent, "Touchy-feely with the new Moto Rokr E8", CES 2010—CNET, available at http://ces.cnet.com/8301-13855_1-9842767-67.html&tag=blog.5, Jan. 6, 2010 (2 pgs.).

* cited by examiner

*Primary Examiner* — Thomas Mullen

(57) ABSTRACT

A system for outputting virtual surface textures, related mobile and other devices, and related methods are disclosed. In one embodiment, the system includes a first haptic component that is configured to output a first virtual surface texture in response to being provided with an electrical signal. The system further includes a memory device that is capable of storing information, and a processing device coupled at least indirectly to the memory device and the haptic component. The processing device at least indirectly causes the electrical signal to be provided to the haptic component upon determining a first condition to have been satisfied, the electrical signal being based at least in part upon the stored information. Also, at least some of the stored information upon which the electrical signal is based is derived at least indirectly from an additional signal received from either the first haptic component or another haptic component.

27 Claims, 5 Drawing Sheets

SYSTEM AND METHOD FOR OUTPUTTING VIRTUAL TEXTURES IN ELECTRONIC DEVICES

FIELD OF THE INVENTION

The present invention relates to electronic devices such as mobile devices that have output capabilities and, more particularly, to systems and methods implemented on such devices allowing for the output of haptic information.

BACKGROUND OF THE INVENTION

An important function of electronic devices such as many mobile devices is to output information by way of various output devices. Typical output devices can include, for example, visual output devices such as video screens and audio output devices such as speakers.

Additionally, some electronic and/or mobile devices include output mechanisms that allow a user to sense the output information by way of the user's sense of touch, that is, the output mechanisms provide haptic information. For example, it is known for a cellular telephone to include a vibration mechanism that is actuated when there is an incoming telephone call or a voicemail message has been received. When actuated to provide vibration, a user of the cellular telephone can be made aware of the incoming call or recorded message. Also, in some mobile devices, a button (or portion of a keypad area or touch screen representative of a button, or corresponding button-like feature such as an icon or link) when pushed will in turn be caused to vibrate, thus giving the user the impression that the device is responding to the user's command.

Notwithstanding the existence of such output mechanisms that provide haptic information, the capabilities of conventional electronic/mobile devices in terms of outputting haptic information remain quite limited. In particular, while human beings' sense of touch is quite refined, allowing human beings to sense a variety of different textures of different materials and items, conventional systems and methods employed on electronic/mobile devices to output haptic information are quite limited in terms of the types of sensations that can be provided such as the vibrations mentioned above.

In view of the above, it would therefore be advantageous if an improved system and method could be developed for implementation in electronic devices such as mobile devices, allowing for the output of haptic information.

SUMMARY OF THE INVENTION

In at least one embodiment, the present invention relates to a system for outputting virtual surface textures. The system includes at least one haptic component including a first haptic component that is configured to output a first of the virtual surface textures in response to being provided with a first electrical signal. The system further includes a memory device that is capable of storing information, and a processing device coupled at least indirectly to the memory device and the haptic component. The processing device at least indirectly causes the electrical signal to be provided to the first haptic component upon determining a first condition to have been satisfied, the electrical signal being based at least in part upon the stored information. Also, at least some of the stored information upon which the electrical signal is based is derived at least indirectly from an additional signal received from either the first haptic component or another haptic component of the at least one haptic component, whereby the first virtual surface texture is output and corresponds at least in part to the additional signal.

Additionally, in at least one embodiment, the present invention relates to a mobile device capable of producing one or more virtual surface textures that to at least some extent correspond to one or more external surface textures. The mobile device includes a plurality of haptic components within a housing of the mobile device, and a memory device at least indirectly in communication with the haptic components, the memory device receiving one or more electrical signals from the haptic components indicative of the one or more external surface textures and storing profile information based upon the one or more electrical signals. The mobile device also includes one or more processing devices coupled at least indirectly to the plurality of haptic components and the memory device, the one or more processing devices configured to at least indirectly cause one or more additional electrical signals based at least indirectly upon at least some of the stored profile information to be provided to the plurality of haptic components. The plurality of haptic components upon receiving the one or more additional electrical signals produce the one or more virtual surface textures, which correspond at least indirectly to at least some of the stored profile information and thus to at least some extent correspond to the one or more external surface textures.

Further, in at least one embodiment, the present invention relates to method of producing, on an electronic device, a virtual surface texture that to at least some extent replicates an external surface texture. The method includes receiving at the electronic device a texture input associated with the external surface texture, and sending a signal indicative of the texture input to a memory device on the electronic device. The method additionally includes storing profile information based upon the signal at the memory device, and determining that a condition has occurred in response to which it is appropriate to produce the virtual surface texture. Further, the method also includes providing a further signal based upon at least some of the profile information at least indirectly from the memory device to a first haptic component, and producing the virtual surface texture by way of the first haptic component, where the virtual surface texture is produced based at least partly upon the further signal, whereby the virtual surface texture to at least some extent replicates the external surface texture.

DETAILED DESCRIPTION

Figure 1:
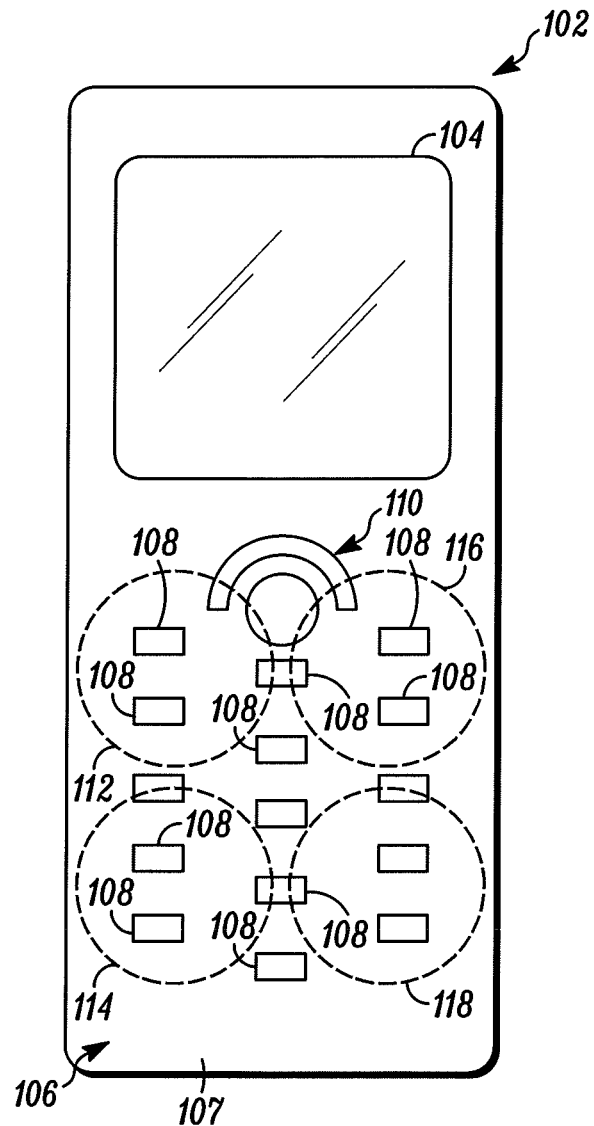
FIG. 1 is a schematic diagram showing a front view of an example mobile device having components that serve as both haptic sensors and haptic output devices.

Referring to FIG. 1, a front view is provided of an example mobile device 102 on which is provided haptic components that serve both as haptic sensors and haptic actuators/output devices (hereinafter often referred to simply as "haptic output devices"). In the present embodiment, the mobile device 102 is a cellular telephone, albeit it should be understood that the present invention is intended to encompass and be implemented in relation to any of a variety of mobile devices including, for example, personal digital assistants (PDAs), smart phones, other handheld or portable electronic devices, headsets, MP3 players, battery-powered devices, wearable devices, radios, navigation devices, laptop or notebook computers, pagers, PMPs (personal media players), DVRs (digital video recorders), gaming devices, and other mobile devices. Further, even though FIG. 1 (as well as FIGS. 2-3 below) concerns the mobile device 102, it should further be understood that the present invention is not intended to be limited to mobile devices or limited to implementation in mobile devices, but rather can encompass and be implemented in a variety of other electronic devices such as desktop computers, televisions, and numerous other devices.

As shown particularly in FIG. 1, the mobile device 102 includes a video screen (display) 104 and a keypad region 106 having alpha-numeric keys 108 and a navigation device (in this case, a "five-way navigation area") 110. In the present embodiment, at or just beneath the keypad region 106, just interior of a front outer surface 107 of the mobile device 102 on which the alpha-numeric keys 108 and navigation device 110 can be touched by a user, are provided four haptic components 112, 114, 116 and 118, respectively (shown in phantom). In the present embodiment, each of the haptic components 112, 114, 116 and 118 doubles as both a haptic sensor capable of sensing in detail the contour(s) or texture(s) of surface(s)/structure(s) in contact with the front outer surface 107/keypad region 106 and thus indirectly in contact with that haptic sensor, as well as a haptic output device that is capable of providing or mimicking a variety of textures such that, when the haptic output device (or the keypad region adjacent thereto) is touched by a user, the user feels those textures.

The exact positioning of the haptic components 112, 114, 116 and 118 within the mobile device 102 can vary depending upon the embodiment. In the present embodiment, the haptic components 112, 114, 116 and 118 are positioned within a housing of the mobile device 102. More particularly, the haptic components 112, 114, 116 and 118 are at or very close to the outer surface of the mobile device 102. Nevertheless, in other embodiments one or more of the haptic components can be positioned farther into the interior of the mobile device. Also, while FIG. 1 shows one example arrangement of haptic components in relation to a housing of a mobile device, depending upon the embodiment, the region(s) along the housing of a mobile device at which the mobile device is sensitive to haptic inputs or can provide haptic outputs can vary widely.

For example, in some additional embodiments, the region over which haptic sensing is possible and/or haptic outputs can be provided corresponds to a screen (e.g., a touch screen) of the mobile device, or a portion thereof. Also, in some embodiments, even though the mobile device is capable of receiving haptic inputs and/or providing haptic outputs over certain regions, for particular applications or under particular circumstances the mobile device restricts such haptic sensing or output such that it only receives haptic inputs at one or more subset(s) or subportion(s) of such region(s), and/or only provides haptic outputs at one or more subset(s) or subportion(s) of such regions(s). Such subset(s) or subportion(s) in some circumstances can correspond to other components or operations of the mobile device. For example, in one embodiment, even though haptic outputs are possibly provided at any location along a touch screen of a mobile device, the mobile device will instead provide a haptic output only at a subregion corresponding to a subportion of the touch screen at which a particular image is displayed.

Figure 2:
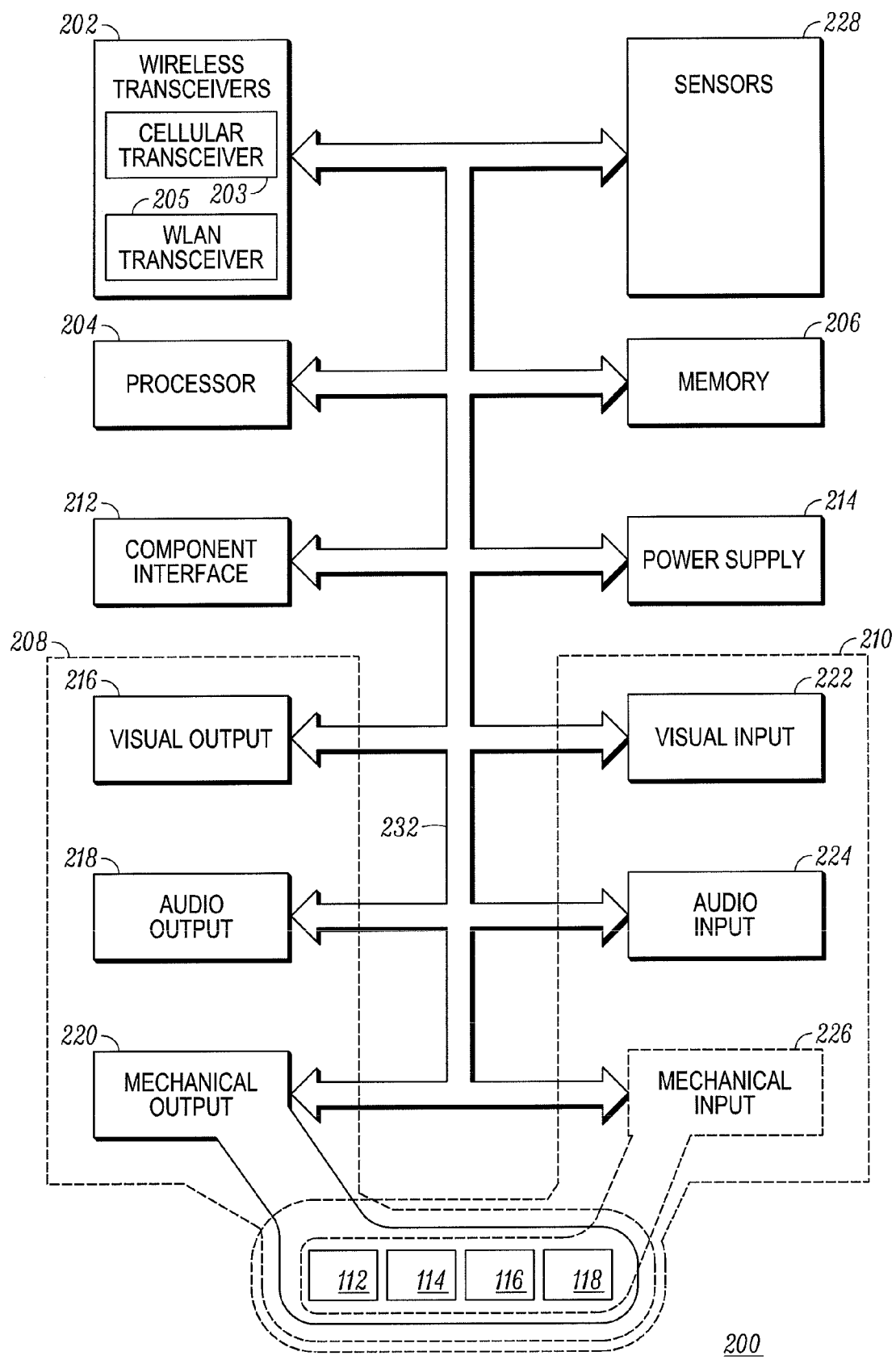
FIG. 2 is a block diagram showing in additional detail various example components of the mobile device of FIG. 1.

Turning to FIG. 2, a block diagram shows in more detail example internal components 200 of the mobile device 102 of FIG. 1 in accordance with one embodiment. As shown, the components 200 include one or more wireless transceivers 202, a processor 204 (e.g., a microprocessor, microcomputer, application-specific integrated circuit, etc.), a memory portion 206, one or more output devices 208, and one or more input devices 210. In at least some embodiments, a user interface is present that comprises one or more of the output devices 208, such as a display, and one or more of the input devices 210, such as a keypad or touch sensor. Indeed, in the present embodiment, as will be discussed further below, certain of the output devices 208 are haptic output devices (haptic actuators) that also serve as haptic input devices (haptic sensors).

The internal components 200 can further include a component interface 212 to provide a direct connection to auxiliary components or accessories for additional or enhanced functionality. The internal components 200 preferably further include a power supply 214, such as a battery, for providing power to the other internal components while enabling the mobile device 102 to be portable. All of the internal components 200 can be coupled to one another, and in communication with one another, by way of one or more internal communication links 232 (e.g., an internal bus).

Each of the wireless transceivers 202 utilizes a wireless technology for communication, which can include for example (but is not limited to) cellular-based communication technologies such as analog communications (using AMPS), digital communications (using CDMA, TDMA, GSM, iDEN, GPRS, EDGE, etc.), and next generation communications (using UMTS, WCDMA, LTE, IEEE 802.16, etc.) or variants thereof, or peer-to-peer or ad hoc communication technologies such as HomeRF (radio frequency), Bluetooth and IEEE 802.11 (a, b, g or n), or other wireless communication technologies such as infrared technology. In the present embodiment, the wireless transceivers 202 include a cellular transceiver 203 and a wireless local area network (WLAN) transceiver 205, although in other embodiments only one of these types of wireless transceivers is present (or alternatively possibly neither of these types of wireless transceivers, and/or possibly other types of wireless transceivers is/are present).

Operation of the wireless transceivers 202 in conjunction with others of the internal components 200 of the mobile device 102 can take a variety of forms. Among other things, the operation of the wireless transceivers 202 can include, for example, operation in which, upon reception of wireless signals, the internal components detect communication signals and one of the transceivers 202 demodulates the communication signals to recover incoming information, such as voice and/or data, transmitted by the wireless signals. After receiving the incoming information from one of the transceivers 202, the processor 204 formats the incoming information for the one or more output devices 208. Likewise, for transmission of wireless signals, the processor 204 formats outgoing information, which may or may not be activated by the input devices 210, and conveys the outgoing information to one or more of the wireless transceivers 202 for modulation to communication signals. The wireless transceivers 202 convey the modulated signals by way of wireless and (possibly wired as well) communication links to other (e.g., external) devices.

Depending upon the embodiment, the input and output devices 208, 210 of the internal components 200 can include a variety of visual, audio and/or mechanical input and output devices. More particularly, the output device(s) 208 can include one or more visual output devices 216 such as a video screen (e.g., the video screen 104 of FIG. 1), a liquid crystal display, or a light emitting diode indicator, one or more audio output devices 218 such as a speaker, alarm and/or buzzer, and/or one or more mechanical output devices 220 such as a vibrating mechanism. Likewise, by example, the input device(s) 210 can include one or more visual input devices 222 such as an optical sensor (for example, a camera), one or more audio input devices 224 such as a microphone, and one or more mechanical input devices 226 such as a keyboard (e.g., the keys 108 of FIG. 1), keypad, selection button, navigation cluster or device (e.g., the navigation device 110 of FIG. 1), touch pad, touchscreen, capacitive sensor, motion sensor, flip sensor, and switch. Actions that can actuate one or more of the input devices 210 can include not only the physical pressing/actuation of buttons or other actuators, but can also include, for example, opening the mobile device 102, unlocking the device, moving the device to actuate a motion, moving the device to actuate a location positioning system, and operating the device.

As shown in FIG. 2, the internal components 200 of the mobile device 102 also can include one or more of various types of sensors 228 that are coupled to other components by the internal communication links 232. The sensors 228 can include, for example, proximity sensors (a light detecting sensor, an ultrasound transceiver or an infrared transceiver), altitude sensors, or a location circuit that can include, for example, a Global Positioning System (GPS) receiver, a triangulation receiver, an accelerometer, a tilt sensor, a gyroscope, or any other information collecting device that can identify a location or user-device interface (carry mode) of the mobile device 102. For purposes of simplifying the present discussion, the sensors 228 will be considered to not include devices that can be considered among the input devices 210, such as touch sensors (although it is understood that the terms sensor and input device could also easily be defined in a different manner such that some sensors are input devices and/or vice-versa).

Figure 5:
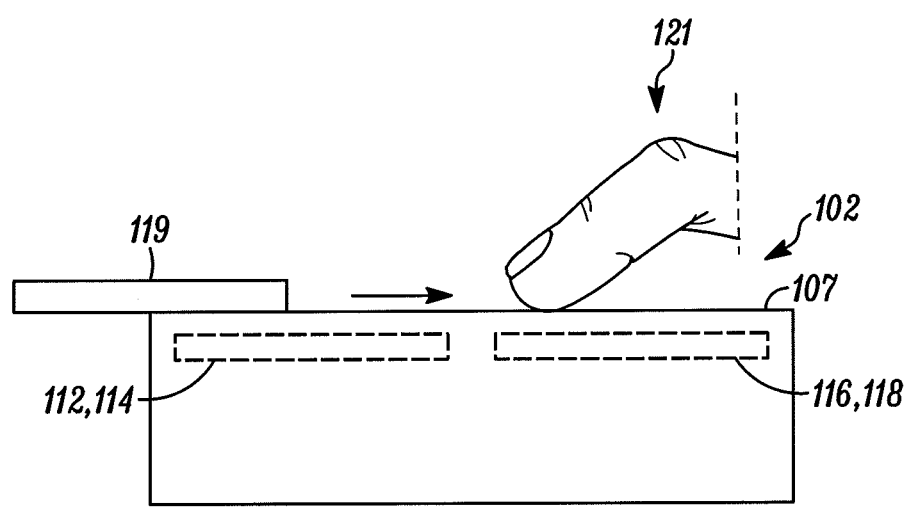
FIG. 5 is a further schematic diagram providing an end view of the mobile device of FIG. 1, and showing a textured surface being slid along a surface of the mobile device.

As already noted, in the present embodiment, some of the internal components 200 serve as both ones of the output devices 208 and ones of the input devices 210. More particularly as shown in FIG. 1, in the present embodiment, each of the haptic components 112, 114, 116 and 118 serves both as one of the mechanical output devices 220 (as a haptic actuator/output device) and one of the mechanical input devices 226 (as a haptic sensor). The haptic components 112, 114, 116 and 118 more particularly are piezoelectric devices such as, for example, small, inexpensive piezo discs or strips. The piezoelectric devices are positioned along (and typically fixedly attached to) the interior side of an outer housing of the mobile device 102 such as is represented by the front surface 107. Although the housing (e.g., the front surface 107) is typically made of a substantially rigid material such as plastic or aluminum, the piezoelectric devices are nevertheless sufficiently sensitive to minute deformations experienced by the housing (or minute pressure impulses transmitted through various regions of the housing) that the piezoelectric devices are able to detect the textures of objects that are in contact with the exterior of the housing (see, e.g., FIG. 5) and generate voltage signals representative thereof. Likewise, when appropriate voltage signals are applied to the piezoelectric devices, those piezoelectric devices are able to generate corresponding vibrations that in turn proceed through the housing and can be sensed exteriorly of the housing by a person when the person's finger (or other body part) is in contact with the housing (also as shown in FIG. 5).

Although in the present embodiment it is envisioned that the haptic components 112, 114, 116 and 118 all doubly serve as haptic sensors and haptic output devices, in other embodiments it is possible for the mobile device 102 to employ one or more haptic components that only serve as sensors, one or more haptic components that only serve as output devices, or one or more haptic components that serve either as sensors or as output devices, but not both. Further, in some embodiments, only haptic output devices but not haptic sensors are present (or vice-versa).

Although piezoelectric devices are mentioned above, and particularly mentioned as being used as both haptic sensors and haptic output devices, in other embodiments a variety of other haptic sensors and/or haptic output components can be utilized. In some embodiments, for example, while piezoelectric devices are used either as haptic sensors or as haptic output devices, the piezoelectric devices do not serve in both capacities but rather other devices serve as haptic sensors while the piezoelectric devices act as haptic output components, or other devices serve as haptic output components while the piezoelectric devices serve as the haptic sensors. Also, in some embodiments, piezoelectric devices are not used at all but rather other devices serve as the haptic sensors and the haptic output components.

For example, in some embodiments, capacitive, resistive, or other touch sensitive film(s) are applied along the front outer surface 107 of the mobile device 102, and are employed as haptic sensing devices (e.g., instead of piezoelectric devices), while piezo electric devices positioned beneath (that is, interiorly of) the touch sensitive film(s) do still serve as the haptic actuators (as piezo actuators). Also for example, in some embodiments vibrators can serve as haptic actuators including, for example, rotary vibrators, linear vibrators, and variable speed vibrators. In such embodiments, any of the above-described haptic sensor mechanisms (e.g., piezoelectric devices or various film(s)) can potentially be employed as the haptic sensors. Further for example, in another embodiment, while piezo electric devices or other actuators are positioned along one surface of the mobile device (e.g., along the front outer surface such as the surface 107), haptic sensors such as piezo electric sensors are instead positioned along another surface of the mobile device (e.g., along the opposite, rear outer surface of the mobile device, for example, along the battery door at the back of a cellular phone or other mobile device).

The memory portion 206 of the internal components 200 can encompass one or more memory devices of any of a variety of forms (e.g., read-only memory, random access memory, static random access memory, dynamic random access memory, etc.), and can be used by the processor 204 to store and retrieve data. In some embodiments, the memory portion 206 can be integrated with the processor 204 in a single device (e.g., a processing device including memory or processor-in-memory (PIM)), albeit such a single device will still typically have distinct portions/sections that perform the different processing and memory functions and that can be considered separate devices. The data that is stored by the memory portion 206 can include, but need not be limited to, operating systems, applications, and informational data. Each operating system includes executable code that controls basic functions of the mobile device 102, such as interaction among the various components included among the internal components 200, communication with external devices via the wireless transceivers 202 and/or the component interface 212, and storage and retrieval of applications and data, to and from the memory portion 206. Each application includes executable code that utilizes an operating system to provide more specific functionality for the mobile device 102, such as file system service and handling of protected and unprotected data stored in the memory portion 206. Informational data is non-executable code or information that can be referenced and/or manipulated by an operating system or application for performing functions of the mobile device 102. As discussed below, the informational data stored on the memory portion 206 in the present embodiment also includes voltage profile information representative of haptic characteristics.

Figure 3:
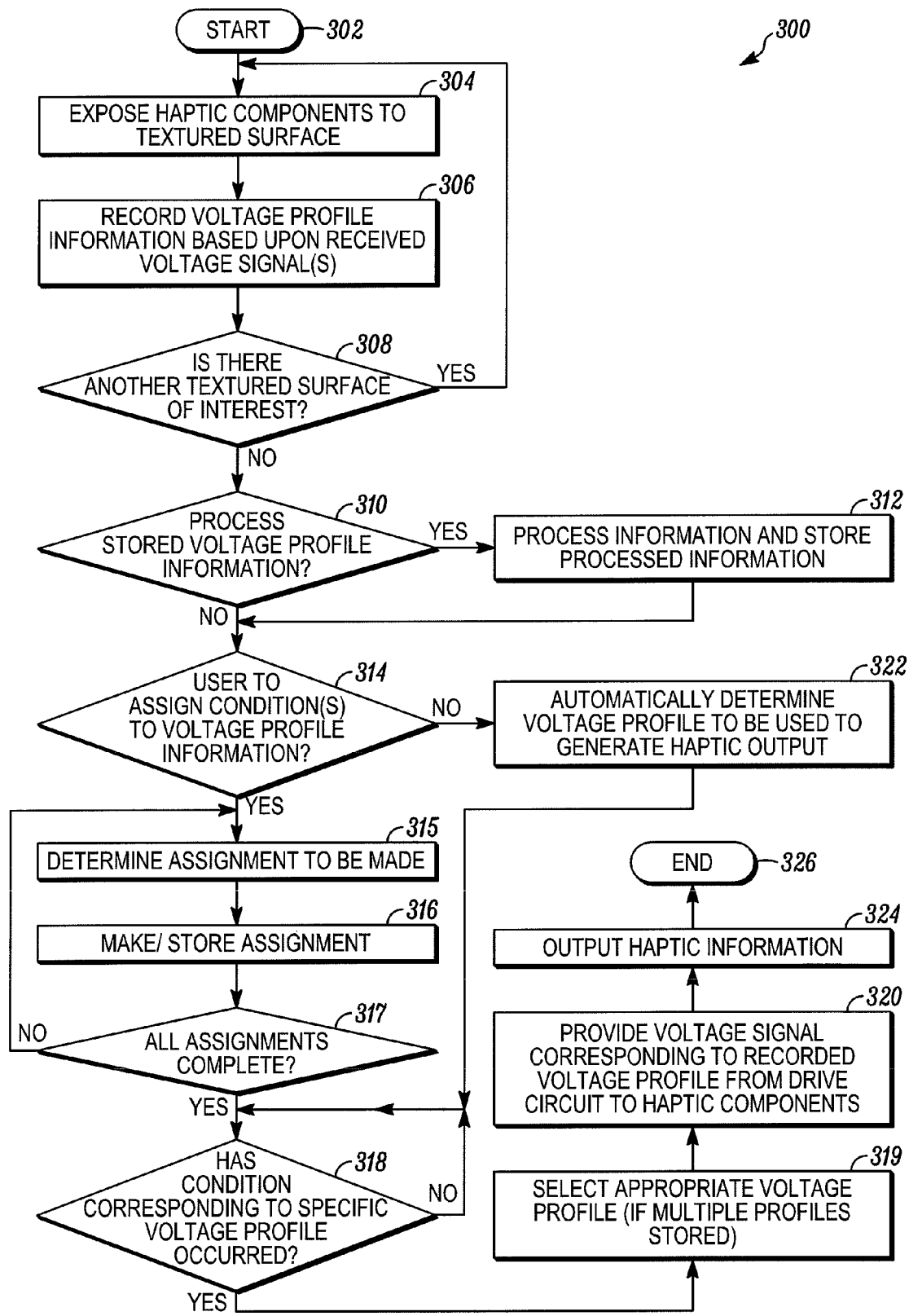
FIG. 3 is a schematic diagram showing various example steps of operation of the mobile device of FIGS. 1 and 2 related to the output of haptic information.

Turning to FIG. 3, a flowchart 300 shows example steps of operation of the mobile device 102 with the haptic components 112, 114, 116 and 118. As represented by the flow chart 300 and discussed below in relation thereto, by physically moving the region of the mobile device 102 with haptic components embedded beneath (again, for example, the keypad region or a lens region) relative to a particular textured surface, the mobile device can record the surface texture as a voltage (or other electronic) profile. Subsequently, the mobile device 102 can control the haptic components to generate the same (or substantially the same) texture that was recorded earlier, such that the user can then feel the same surface texture. The sensation perceived by the user is as if the mobile device is mimicking the surface profile that was sensed ("felt") by the mobile device earlier.

More particularly as shown, after starting operation at a start step 302, at a step 304 the haptic components 112, 114, 116 and 118 of the mobile device 102 are exposed to a textured surface. Such exposure can occur as illustrated in FIG. 5, which shows an example object with a textured surface 119 being slid (in the direction indicated by the arrow) along the front outer surface 107 of the mobile device 102 of FIG. 1. The textured surface can, depending upon the embodiment or circumstance, be any of a multitude of different structures or surfaces having a texture or feel of particular interest. For example, the textured surface can be a rough surface such as sandpaper, a smooth surface such as paper, a medium smoothness surface such as canvas or certain types of wood grain, or a soft surface such as felt or another fabric. Although the textured surface can often be flat, it need not be flat. Rather, the textured surface can have a variety of other shapes such as shapes that are only approximately flat such as the outer spherical surface of a large object such as a basketball (large relative to the size of the haptic components themselves), or even an object that has a surface that is not properly considered flat (even, for example, a stylus, a pen tip, or a thin narrow surface such as that provided by an edge of an object such as a paper clip or pin).

As mentioned above, in the present embodiment, the haptic components 112, 114, 116 and 118 are piezoelectric sensor/actuator components that serve both as haptic sensors and haptic output devices, and that are positioned adjacent to (along the interior side of) portion(s) of the housing of the mobile device 102 such as the front surface 107. As such, when the object with the textured surface 119 is placed in contact with and moved across (e.g., slid, wiped, or rubbed across) the housing/front outer surface 107 as shown in FIG. 5, the haptic components 112, 114, 116 and 118 detect the slight deformations/pressure changes experienced along the front outer surface due to the presence and movement of that object, which are communicated through the housing/front surface to the haptic components.

As a consequence of detecting the slight deformations/pressure changes, the haptic components 112, 114, 116 and 118 in turn output one or more voltage signals (or alternatively other electric signals such as current signals) reflective of that textured surface. Thus, at a step 306, upon the haptic components 112, 114, 116 and 118 being exposed to the textured surface, voltage signal(s) sent from the haptic components are received by the memory portion 206 of the mobile device 102 and, based upon those voltage signal(s), voltage profile information representative of the textured surface to which the haptic components 112, 114, 116 and 118 were exposed is recorded in the memory portion. It should be noted that, while the textured surface can be positioned and/or moved in relation to the haptic components 112, 114, 116 and 118 in the step 304, alternatively the haptic components can be physically moved over or along the desired surface texture, thus also allowing the texture to be sensed and captured by the mobile device.

Although not shown in FIG. 3, depending upon the embodiment or circumstance, at the step 306, it is further possible for names or other appropriate indicators to be ascribed to particular voltage profile information that has been recorded. For example, in some embodiments, upon the recording of voltage profile information, the user is prompted with a message on the mobile device 102 requesting a name to be provided corresponding to the voltage profile information that was just stored. For example, if the textured surface to which the haptic components 112, 114, 116 and 118 were exposed in the step 304 was a felt surface, the user might ascribe the word "felt" or the word "soft" or "fuzzy" upon being prompted to enter a name or other indicator corresponding to that voltage profile information that was obtained at the step 304.

Referring again to FIG. 3, while on some occasions only one textured surface is of interest, on other occasions there are multiple different textured surfaces that are all of interest. To provide for this possibility, upon the recording of the voltage profile information at the step 306, at a step 308 it is then determined whether there is another textured surface of interest to which the haptic components 112, 114, 116 and 118 should be exposed. This determination can be made based upon a variety of factors including user inputs (e.g., inputs provided via the input devices 210). For example, upon completion of the step 306 (or prior to the step 304), one of the visual output devices 216 can display a message inquiring as to whether a textured input is to be provided, in response to which the user can provide an input via one of the mechanical input devices 226 indicating yes or no. If at the step 308 it is determined that there is another textured surface that is of interest, the process returns to the step 304 as indicated. Alternatively, if there is no other textured surface that is currently of interest, then the process advances to a step 310.

It should be noted that, despite the above discussion regarding the generating of voltage profile information based upon the exposure of the mobile device 102 to one or more textured surfaces, such operation of the mobile device need not always be performed in order to populate the memory portion 206 of the mobile device with voltage profile information. Rather, in alternate embodiments, voltage profile information can instead or additionally be provided from other sources. For example, in some alternate embodiments, libraries of virtual textures (or voltage profiles representative of virtual textures) are available either from the manufacturer of the mobile device or one or more third parties (e.g., Google-Market). Assuming the availability of such libraries, the mobile device 102 can access the virtual texture information at such external sources by way of the wireless transceivers 202 (e.g., by way of wireless internet) and/or the component interface 212, and thus the mobile device can download the desired virtual texture information (or voltage profile information). Further for example, in some alternate embodiments, the memory portion 206 of the mobile device 102 is pre-populated with a variety of virtual texture/voltage profile information when manufactured.

At the step 310, the mobile device 102 determines whether the voltage profile information that was previously recorded at the step 306 (or otherwise obtained, such as from an external source) should be processed in some manner. If at the step 310 it is determined that no processing is desirable or appropriate (or required), then the mobile device 102 proceeds from the step 310 directly to a step 314. Alternatively, if processing is desirable or appropriate, then at a step 312 such processing is performed, the processed voltage profile information is stored in the memory portion 206, and then the process advances to the step 314. Depending upon the embodiment, the type of processing that is performed can take a variety of forms. For example, the magnitude(s) of certain portions of a voltage profile can be increased or decreased relative to that of other portions of the voltage profile.

The type of processing that is performed in the step 312 can in some circumstances be determined entirely or partly by user inputs. For example, various processing options can be presented to the user on one of the visual output devices 216 and the user can then select one or more of those options. Alternatively, in some cases the processing that is performed is determined automatically. Additionally, although in FIG. 3 the processing is performed subsequent to the initial recording of voltage profile information at the step 306, in other embodiments the processing can be performed directly upon the electrical signals received from the haptic components 112, 114, 116 and 118, prior to the storing of the voltage profile information. Such processing can include, for example, filtering as discussed further below with respect to FIG. 4.

Once the voltage profile information has been stored (at the step 306) and, if applicable, processed (at the step 310), it is further determined at the step 314 whether one or more condition(s) should be assigned to or correlated with that voltage profile information based upon user inputs. The assigning of specific condition(s) to the voltage profile information at the step 314 is, in the present embodiment, intended to define condition(s) (e.g., events, occurrences, characteristics, etc.) that, when sensed, detected or otherwise determined by the mobile device 102 to be present or to have occurred, serve as a basis or bases for triggering the mobile device to output virtual surface texture(s) corresponding to the voltage profile information assigned to those condition(s). For example, in one scenario, it might be desirable for the mobile device 102 to provide an indication to a user that there are unopened voicemail messages in the mobile device voicemail system by (rather than providing a beep or other audio output) creating a virtual surface texture on the haptic components 112, 114, 116 and 118 that was of a particular type (e.g., a rough texture). To effect this type of operation, a condition ("unopened voicemail message") would be associated with voltage profile information corresponding to a rough surface.

Assuming that condition(s) are to be assigned to voltage profile information based upon user inputs as determined at the step 314, then the process advances to a step 315, at which a first determination is made as to one particular condition that should be assigned to a particular voltage profile. For example, a user can be presented with a drop-down menu listing various voltage profiles that are stored in the memory portion 206 and available for use, and the user can select one of those voltage profiles (e.g., a "rough" surface as mentioned above). Then, upon selection of one of those voltage profiles, a further drop-down menu can be provided from which the user can select a given condition to be associated with the selected voltage profile (e.g., an "unopened voicemail message"). Or, alternatively, this process can be reversed, where the user first will specify a condition of interest and then select a voltage profile to be associated with that condition of interest.

Once a determination has been made as to an association between a condition and particular voltage profile information, then at a step 316 that assignment is made and stored in the memory portion 206. Once the assignment has been made and stored, then at a further step 317 it is determined whether any other assignments of additional condition(s) to other voltage profile information still need to be made. This determination can be made automatically based upon whether there are any other voltage profile(s) stored in the memory portion 206 with respect to which there have not been any assignment(s) of condition(s), or alternatively be determined based upon user input. If further assignments remain to be made as determined at the step 317, then the process returns to the step 315. Alternatively, if all assignments have been made, then the process advances to a step 318.

As noted above, the purpose of associating condition(s) with voltage profile(s) is to define how the mobile device 102 will operate in terms of outputting virtual surface textures. Assuming such associations have been made, then at the step 318 the mobile device 102 subsequently monitors as to whether any such condition(s) have been satisfied. As already discussed, the condition(s) can take a variety of forms depending upon the embodiment and so the determination of whether a condition has occurred can involve a variety of operations by the mobile device 102. In some cases, whether a condition has occurred depends partly or entirely upon whether a particular user input or command has been received by the mobile device 102. For example, in some embodiments different device applications (e.g., reading a document, web browsing, etc.) are associated with different ones of the virtual surface textures. A user command to launch or actuate (or simply the launching or actuation of) a given one of those device applications can, in such embodiments, then be recognized by the mobile device 102 as an occurrence triggering the outputting of a corresponding one of the virtual surface textures.

Further, in at least some embodiments, the condition that determines whether a particular virtual surface texture is to be output is simply the user's selection of that virtual surface texture (or a particular stored texture profile) from a menu of various possible virtual surface textures (or stored texture profiles). That is, in some embodiments, the condition(s) determining the output of virtual surface textures are simply user commands to the mobile device that such virtual surface textures be output. Such operation is appropriate, for example, in circumstances where profile information is downloaded or otherwise obtained from an external source as discussed above rather than obtained through the sensing and processing of textured surfaces by the mobile device itself (e.g., by way of the steps 304-312 of FIG. 3). It should further be noted that the particular user command(s) that trigger the generation of a particular virtual surface texture can vary depending upon the embodiment.

For example, while in one embodiment the mere selection of a virtual surface texture (or texture profile) from a menu or other listing of available options will immediately trigger the generation of that virtual surface texture on the mobile device 102, in another embodiment such a selection merely causes the mobile device to enter a mode of operation in which it is poised to output that virtual surface texture upon yet another condition being met (e.g., poised to output that virtual surface texture when the mobile device senses that the user has touched a touch screen of the mobile device or a portion thereof in a manner signifying that the user wishes for that virtual surface texture to be output).

Regardless of the particular condition(s) that are associated with (or otherwise determine) the virtual surface texture(s) that are to be output, in the present exemplary embodiment, the mobile device 102 continues to monitor for such condition(s) until one or more condition(s) have been satisfied—that is, as shown, if no condition is satisfied, then the mobile device 102 continues to repeat the step 318. Once one of the condition(s) corresponding to one of the voltage profile(s) is determined to have been satisfied, then the process advances to a step 319, at which the mobile device 102 then selects the appropriate voltage profile information (assuming there are multiple voltage profiles stored) corresponding to the condition from the memory portion 206.

Upon selecting the appropriate voltage profile information, the process then further advances to a step 320, at which the processor 204 of the mobile device 102 causes voltage signal(s) corresponding to the selected voltage profile to be provided from a drive circuit of the mobile device to the haptic components 112, 114, 116 and 118. Depending upon the embodiment, the drive circuit can take a variety of forms. In the present embodiment, the drive circuit can be considered part of the processor 204, although in alternate embodiments it can be a distinct circuit. Upon the haptic components 112, 114, 116 and 118 being provided with the voltage signal(s), at a subsequent step 324 one or more virtual surface texture(s) corresponding to the selected voltage profile are output by the haptic components. In this manner, therefore, the occurrence of a given condition associated with a given voltage profile corresponding to a particular haptic sensation triggers the output of virtual texture(s) that provide that haptic sensation.

Although the above discussion presumes that it is decided at the step 314 that assignments of condition(s) are to be made to various voltage profile(s) based upon user inputs, this need not always be the case. Rather, in some circumstances, voltage profile information is automatically associated with particular conditions that are to be sensed, detected or determined, or with other criteria. Thus, if at the step 314 it is determined that user inputs are not the basis for assigning condition(s) to voltage profile(s), then instead of proceeding to the steps 315-317 the process instead advances to a step 322 at which the mobile device 102 automatically determines the condition(s) corresponding to different voltage profile(s) that are to be used to generate the haptic output.

The process then proceeds again to the steps 318-324 such that, upon a particular condition being satisfied, an associated voltage signal is selected and provided to the haptic components and the haptic components output corresponding texture information. A person can at such time then feel the virtual surface texture being generated, for example, by touching the front outer surface 107 with a finger 121 (shown in cutaway) as illustrated in FIG. 5. In the present embodiment in which piezoelectric devices serve as the haptic output components, the virtual surface texture produced by the piezoelectric devices that can be felt by the finger 121 is one or more vibrations that are communicated through the housing/front surface 107 from the interior of the housing to the exterior of the housing. Although such vibrations can be felt to some degree if the finger 121 is in contact with but merely stationary with respect to the housing, the vibrations will be more clearly felt, and the virtual surface texture that is felt will more closely approximate or replicate the actual texture of the textured surface (e.g., the textured surface 119) that originally gave rise to the profile information used to generate the virtual surface texture, if the finger is moved (e.g., slid, wiped, rubbed) across the front surface 107. Upon the completion of the step 324, the process is ended at a step 326.

Figure 4:
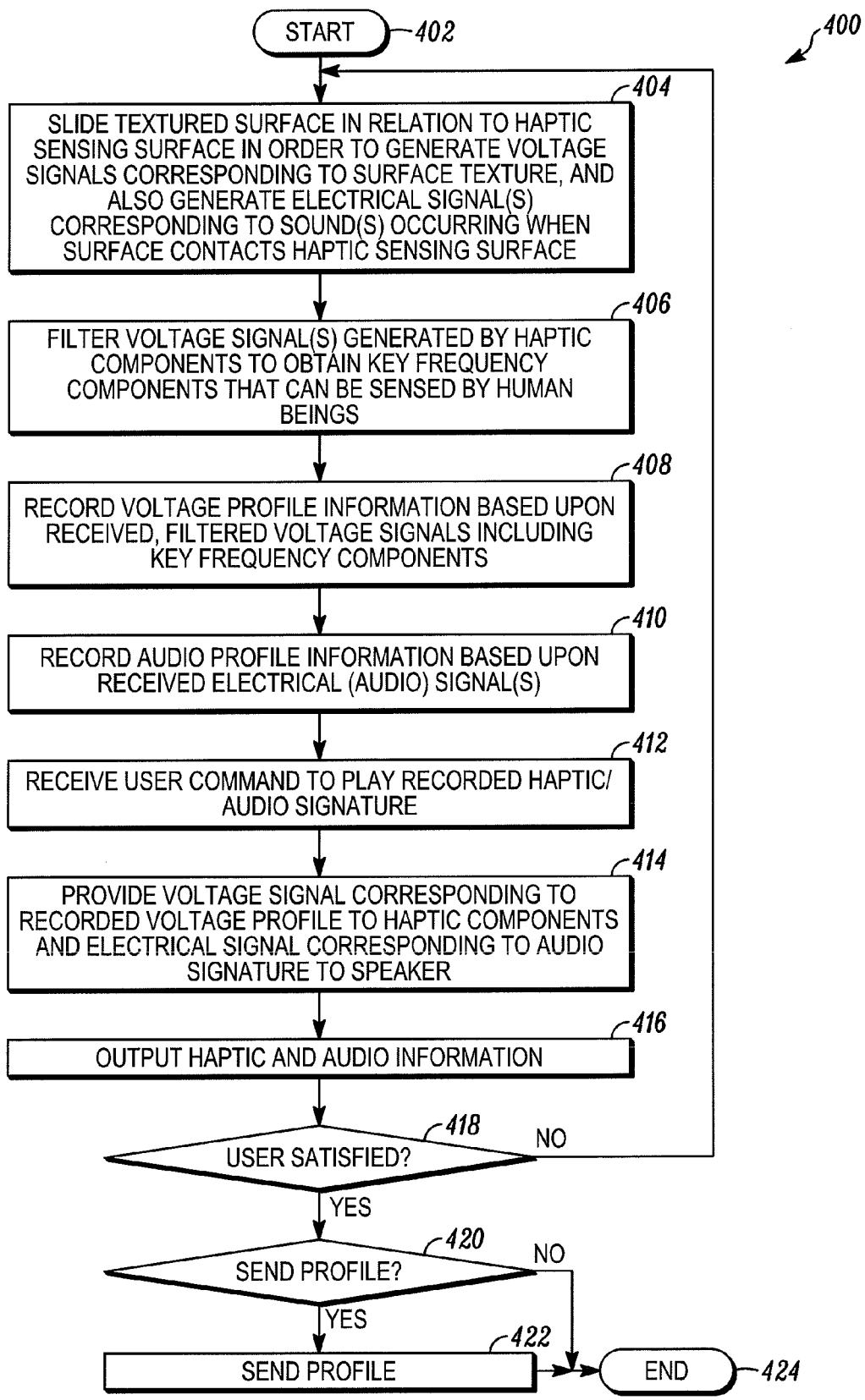
FIG. 4 is an additional schematic diagram showing additional example steps of operation of the mobile device of FIGS. 1 and 2.

Turning next to FIG. 4, an additional flowchart 400 shows further example steps of operation of the mobile device 102 with the haptic components 112, 114, 116 and 118. In this example, upon starting at a step 402, at a step 404 the operation again begins with sliding of a textured surface (e.g., the textured surface 119 of FIG. 5) in relation to the surface of the mobile device at or beneath which are positioned the haptic components 112, 114, 116 and 118 (e.g., the front outer surface 107 of FIG. 5), so as to generate voltage signal(s) corresponding to the texture of that surface. In at least some embodiments, this portion of the step 404 can be considered identical to the step 304 of FIG. 3. However, in contrast to the step 304, the step 404 also includes a second aspect in which, as the textured surface is slid in relation to the mobile device 102, additional electrical signals are generated by a sound sensor of the mobile device that reflect the sounds occurring as the textured surface is slid in relation to the mobile device. Thus, in the step 404, both haptic information and audio information are captured by the sensors of the mobile device 102. It should be noted that the sound sensor employed in the step 404 can be a microphone and be considered one of the audio input devices 224 of FIG. 2. 100481 As mentioned above with respect to FIG. 3, in some embodiments the voltage (or other electrical) signals generated as a result of the sliding of the textured surface in relation to the haptic sensing surface can be filtered or otherwise processed prior to the recording of those signals. This is the case in the embodiment of FIG. 4, where at a step 406 the voltage signal(s) generated by the haptic components 112, 114, 116 and 118 are filtered prior to the storing of that information, which occurs at a subsequent step 408. In the present embodiment, the filtering performed at the step 406 is particularly intended to filter out signal components that cannot be sensed by human beings, so as to result in filtered voltage signal(s) that include only (or primarily or substantially only) signal components that can be sensed by human beings' skin (e.g., signal components in the range of 1-1500 Hz).

The filtering performed at the step 406 can be performed by any of a variety of filter mechanisms, including filtering circuitry that can be implemented independently of, or considered part of, the processor 204. For example, in some embodiments, the filtering/processing involves use of a Fast Fourier Transform (FFT) allowing for the decomposing of the voltage signal(s) generated by the haptic components 112, 114, 116, 118 into their spectral/frequency components and further allowing certain spectral/frequency components to be passed while others are filtered out. After the undesired frequency components are filtered out, an inverse Fast Fourier Transform (inverse FFT) can then be performed to generate the filtered voltage signal(s) to be stored in the memory portion 206. Although the above discussion focuses upon filtering that removes certain frequencies and passes others, in other embodiments, the filtering can also take into account other factors such as human sensing thresholds that are a function of pulse duration, contactor area, frequency, etc.

Upon such filtering being completed at the step 406, then at the step 408 the voltage profile information based upon the received, filtered voltage signals is stored. Additionally, at a step 410, audio profile information based upon the received electrical (audio) signal(s) generated at the step 404 is also stored. It will be understood that steps 408 and 410 can be performed contemporaneously and also that, in other embodiments, the electrical (audio) signal(s) generated at the step 404 are also filtered prior to their being recorded at the step 410. Although for clarity the signals containing audio information that are generated at the step 404 and stored at the step 410 are referred to as electric signals to distinguish those signals from the voltage signals provided by the haptic components, it should be understood that these electrical signals can in some embodiments also be voltage signals. Indeed, the signals from both the haptic components 112, 114, 116, 118 and the microphone (or other sound sensor(s)) can be any of voltage, current, or other electrical signals.

Next, at a step 412, the mobile device 102 can receive a user command to play the recorded haptic/audio signature represented by the recorded voltage profile information and audio profile information. If such a command is received by the mobile device 102 (in the present example, it is assumed that such a command is in fact received), then at a further step 414 the processor 204 causes voltage signal(s) corresponding to the recorded voltage profile information to be provided to the haptic components 112, 114, 116, 118 and also causes electrical signal(s) corresponding to the recorded audio profile information to be provided to appropriate one(s) of the audio output devices 118, such as a speaker. The signals communicated to the haptic components and audio output device(s) in the step 414 can in some circumstances be provided by a drive circuit as discussed with respect to the step 320 of FIG. 3. Upon these signals being provided to the haptic components 112, 114, 116, 118 and audio output device(s) 118, virtual surface texture(s) corresponding to the haptic information is output by the haptic components at a step 416, and likewise audio output is also output by the audio output device(s) at the step 416.

In the present embodiment, the outputting of the haptic and audio information at the step 416 is in response to the user command provided at the step 412. Such outputting of the haptic and audio information allows the user to then determine whether the recorded haptic and audio information is satisfactory as a representation of the actual texture of the textured surface and of the sound generated by the textured surface as that surface is slid in relation to the mobile device 102. If the user is not satisfied, upon feeling and hearing the playback of this information at a step 418, then the process returns to the step 404, at which the textured surface is again slid in relation to the mobile device 102 (e.g., the front outer surface 107), so as to obtain a new sampling of haptic and audio information. Alternatively, assuming that the user is satisfied at the step 418, then the stored haptic and audio profile information can be used for various purposes.

As additionally shown in FIG. 4, in some embodiments the stored haptic and audio information can be sent to another location (e.g., to another mobile device) for use by other devices or for other purposes. That is, upon completion of the step 418, at a step 420 the mobile device 102 can determine whether the user has provided a command to send the stored profile information to another location. If no such command has been provided, then the process represented by the flow chart 400 ends at a step 424. Alternatively, if such a command has been provided, then the profile is sent to the other location at a step 422 prior to the process ending at the step 424. The information, when sent in this manner to another location, can be sent in any of a variety of forms, such as an email or email attachment, in accordance with the File Transfer Protocol (FTP), or as a Short Message Service (SMS) message.

It should be noted that, in the embodiment of FIG. 4, the haptic information output by the haptic components 112, 114, 116, and 118 at the step 416 (and sent at the step 422) is not intended to be an identical replica of the haptic information sensed by the haptic components during the step 404. Rather, the haptic information that is output is a synthesized version of that received haptic information, since the received haptic information is filtered to obtain the key frequency components of interest at the step 406 prior to the voltage profile information being stored at the step 408. Nevertheless, in many such embodiments, the synthesized version should typically be a good approximation of the received haptic information, since the synthesized version is intended to include all of the signal components that a human being is capable of sensing. Alternatively, in other embodiments in which no filtering or other processing is performed at the step 406 (or other steps such as the step 312 of FIG. 3) then the output haptic information can be considered "raw" haptic information corresponding more exactly to the voltage signal(s) originally generated by the haptic components at the start of the process, e.g., at the step 404 of FIG. 4 (or the step 304 of FIG. 3).

Although FIGS. 3 and 4 show different exemplary steps of operation of the mobile device 102, it should be understood that in any given embodiment a mobile device can perform any of the steps shown in one or both of FIGS. 3 and 4 (as well as possibly other steps as well). For example, while FIG. 3 does not show the receipt, storing or outputting of audio signals, in other embodiments such operations can also be performed in conjunction with the other steps provided in FIG. 3. Also for example, while FIG. 4 does not include steps corresponding to the steps 310-319 of FIG. 3 relating to the processing of stored information, the assigning of particular conditions to particular haptic (or other) information, or determining whether to output various haptic (or other) information based upon the occurrence of particular conditions corresponding to such haptic (or other) information, in other embodiments FIG. 4 can also include one or more of such steps.

It should be evident from the above description that mobile devices and other electronic devices employing haptic components in the manner discussed above or in similar manners can afford numerous benefits to users in terms facilitating the transmission of data to users and otherwise enhancing user experience through the medium of touch. Although the haptic components 112, 114, 116 and 118 in the above-described embodiment are associated with (positioned at or near) the keypad region 106 of the mobile device 102, in other embodiments one or more haptic components can be positioned at other locations in addition to, or instead of, near or at the keypad region of the mobile device (or other electronic device).

Although not necessarily the case in all embodiments, a user's experience is particularly enhanced in at least some embodiments, insofar as the implementation of haptic components allows the user to interact with a mobile device screen capable of providing different virtual textures for different user actions. That is, in some embodiments, a variety of different textures (represented by a variety of different virtual profiles) can be associated with a variety of user actions/events such as typing, scrolling, texting, reading, gesturing, painting, writing with a stylus, etc., such that, when a user is taking one of these actions, the corresponding distinctive virtual texture is output. This can improve the user's experience both aesthetically and in terms of providing the user with useful feedback.

For example, when a person is scrolling across a web page displayed on the video screen of the mobile device, the haptic components can provide a tactile sensation of running a finger across a smooth paper textured screen. Also for example, when reading an e-book, the haptic components can make the user feel he is turning a real page by producing a virtual surface texture that mimics a page surface. Further for example, when the user is writing/drawing using a stylus, the haptic components can make the surface texture virtually mimic a canvass or paper feel. In each case, not only can the virtual texture provide the user with a pleasant sensation, but also the virtual texture can communicate to the user (or give reassurance to the user) that the user is actually taking a particular desired action or proceeding in a particular desired manner.

In at least some embodiments, the haptic components especially facilitate user interactions with the mobile (or other electronic) device that are more complicated, particularly interactions with touch screens on such mobile (or other electronic devices), such as swiping and scrolling across the screens, typing or writing on screens with hand or stylus-based techniques. By comparison with conventional touch screen interactions, in which no enhanced haptic feedback is provided and the user typically interacts with a "dead glass screen", embodiments employing haptic components as discussed above allow for the providing of distinctive feedback to the user as the user interacts with the mobile (or other electronic) device. Such feedback in particular allows the user to have greater confidence that the user's commands are being responded to, and/or allows the user to perceive sensations from the mobile (or other electronic) device by which additional information is communicated to the user in a simple or intuitive manner.

It should be noted that the manner in which particular haptic sensations and corresponding voltage profile information are associated with different condition(s) can vary widely depending upon the embodiment and, indeed, the particular associations are customizable for each individual mobile (or other electronic) device and/or customizable to the needs or desires of any given user. It should further be noted that the conditions triggering the outputting of virtual surface textures can include simply a user request or command that a particular virtual surface texture be output. That is, in some embodiments, any voltage profile constituting a recorded surface texture can be "played back" by the mobile device 102 in response to a user request/command to do so. Upon the request/command being received from a user (at the step 318), the mobile device will in turn utilize the stored voltage profile information to create the virtual surface texture corresponding to that voltage profile at the haptic components for sensing by the user.

In view of the above discussion, it should be evident that embodiments of electronic devices having haptic capabilities such as those discussed above can provide one or more attractive features. In at least some embodiments, the same haptic components can be used to record and create (in virtual form) any (or nearly any) surface texture. Additionally, virtual surface texture creation is an attractive sensory feature that allows for enhanced user experience, as it adds tactile stimulus in addition to other available sensory experiences (such as audio/visual experiences). This can be not only appealing from a sensory or aesthetic experience, but also can be valuable from the standpoint of communicating information and feedback to a user, which in turn can facilitate the ability of a user to perform advanced touch-based gestures such as scrolling, painting, typing, reading, etc. (above and beyond merely basic button click actions).

The value of the above haptic capabilities can be high also because they make it possible to customize the virtual textures that are output by the haptic components to suit any given user's preferences and/or needs as well as suit the particular characteristics of the electronic (e.g., mobile) device on which the haptic functionality is provided. That is, the above haptic capabilities can be implemented in a multitude of different manners depending upon the user, the electronic device being employed by the user, operational circumstances, and other factors. Any of a variety of different virtual surface textures can be provided arising from any of a variety of sources including even possibly user-created textures.

Further advantageous is the fact that, in at least some embodiments, the cost associated with implementing such haptic capabilities on mobile and other electronic devices is not high since conventional piezoelectric (and piezo haptic) components (and/or other conventional components) can be employed. Further reducing the cost, in at least some embodiments, is the ability to utilize the same haptic components as both haptic actuators/output components as well as haptic sensors. Additionally, the amount of memory required, and thus the cost of memory, can be reduced in embodiments where the voltage signal(s) generated by the haptic (sensor) components are filtered so as to only pass frequency components that can be sensed by human beings as discussed with reference to FIG. 4, since substantially less information need be stored in such embodiments. The use of such filtered haptic information to output synthesized (or re-synthesized) haptic information can be further advantageous insofar as the virtual surface texture that is output will be more consistent regardless of what haptic components generate the virtual surface texture (even if the virtual surface texture is ultimately output on more than one mobile device or other device), since the output of the various frequency components forming the virtual surface texture will not be limited by the bandwidth of the play-back device.

It is specifically intended that the present invention not be limited to the embodiments and illustrations contained herein, but include modified forms of those embodiments including portions of the embodiments and combinations of elements of different embodiments as come within the scope of the following claims.

I claim:

1. A system for outputting virtual surface textures, the system comprising:
    at least one haptic component including a first haptic component that is configured to output a first of the virtual surface textures in response to being provided with a first electrical signal;
    a memory device that is capable of storing information; and
    a processing device coupled at least indirectly to the memory device and the at least one haptic component,
    wherein the processing device at least indirectly causes the electrical signal to be provided to the first haptic component upon determining a first condition to have been satisfied, the electrical signal being based at least in part upon the stored information, and
    wherein at least some of the stored information upon which the electrical signal is based is derived at least indirectly from an additional signal received from either the first haptic component or another haptic component of the at least one haptic component,
    whereby the first virtual surface texture is output and corresponds at least in part to the additional signal.

2. The system of claim 1, wherein the information stored by the memory device includes a plurality of textural profiles.

3. The system of claim 2, wherein the system displays a menu showing a plurality of selectable items corresponding to the plurality of textural profiles, and wherein the system includes an input device by which the system is capable of receiving a user signal indicating a user selection of one of the selectable items.

4. The system of claim 3, wherein the stored information regarding the plurality of textural profiles is received from an external source.

5. The system of claim 2, further comprising an input device configured to receive user inputs,
   wherein the processing device receives, from the input device, a first signal representative of a first user input selecting a portion of the stored information regarding a first of the textural profiles corresponding to the first of the virtual surface textures, and wherein the receiving of the first signal is determined to constitute the satisfying of the first condition.

6. The system of claim 1, wherein the electrical signal is a voltage signal and the stored information includes voltage profile information representative of at least one haptic characteristic, the at least one haptic characteristic related to deformations or pressure changes detected by either the first haptic component or the other haptic component.

7. The system of claim 6, wherein the additional signal is generated by the first haptic component or the other haptic component upon detecting the deformations or pressure changes associated with a positioning or a movement of a textured surface of an external structure with respect to the first haptic component or the other haptic component.

8. The system of claim 7, wherein the additional signal is generated by the first haptic component, the first haptic component being capable of operating both as a haptic sensor and as a haptic output device.

9. The system of claim 8, wherein the first haptic component is a piezoelectric device capable of operating as a piezoelectric sensor and a piezoelectric actuator.

10. The system of claim 7, wherein the additional signal is filtered prior to being provided to the memory device, and wherein at least some of the stored information is based upon the filtered additional signal.

11. The system of claim 10, wherein the additional signal is filtered so that the filtered additional signal substantially includes signal frequency components that correspond to a touch sensing ability of a human being.

12. A mobile device comprising the system of claim 1, wherein the at least one haptic component includes a plurality of haptic components including the first haptic component, and wherein each of the haptic components is positioned respectively at a respective location within the housing of the mobile device.

13. The mobile device of claim 12, wherein the mobile device is selected from the group consisting of a cellular telephone, a personal digital assistant, a smart phone, a headset, a MP3 player, a battery-powered device, a wearable device, a radio, a navigation device, a laptop computer, a notebook computer, a pager, a personal media player, a digital video recorder, and a gaming device.

14. The mobile device of claim 12, wherein the mobile device is one of a cellular telephone, a personal digital assistant, and a smart phone, and
   wherein the mobile device further comprises a display screen on which is displayed a menu showing the virtual surface textures that are selectable, from which the first virtual surface texture is selected.

15. A mobile device capable of producing one or more virtual surface textures that to at least some extent correspond to one or more external surface textures, the mobile device comprising:
   a plurality of haptic components within a housing of the mobile device;
   a memory device at least indirectly in communication with the haptic components, the memory device receiving one or more electrical signals from the haptic components indicative of the one or more external surface textures and storing profile information based upon the one or more electrical signals; and
   one or more processing devices coupled at least indirectly to the plurality of haptic components and the memory device, the one or more processing devices configured to at least indirectly cause one or more additional electrical signals based at least indirectly upon at least some of the stored profile information to be provided to the plurality of haptic components,
   wherein the plurality of haptic components upon receiving the one or more additional electrical signals produce the one or more virtual surface textures, which correspond at least indirectly to at least some of the stored profile information and thus to at least some extent correspond to the one or more external surface textures.

16. The mobile device of claim 15, wherein either the profile information stored at the memory device is processed by the one or more processing devices before the one or more additional electrical signals are provided, or the one or more electrical signals received by the memory device are processed by the one or more processing devices before the profile information based upon the one or more electrical signals is stored.

17. The mobile device of claim 15, wherein the one or more electrical signals are filtered before the profile information based upon the one or more electrical signals is stored, such that the stored profile information substantially includes only frequency components that can be sensed by human beings.

18. The mobile device of claim 15, wherein each of the haptic components is a piezoelectric device that serves both as a haptic sensor and a haptic actuator.

19. The mobile device of claim 15, wherein the memory device further records a plurality of associations between a plurality of conditions and a plurality of portions of the stored profile information, and wherein the one or more processing devices are configured to at least indirectly cause the one or more additional electrical signals to be provided upon one or more occurrences of one or more of the conditions.

20. The mobile device of claim 15, further comprising:
   a microphone for sensing one or more sounds arising when a first of the haptic components detects deformations or pressure changes associated with one or more of the external surface textures and generating one or more audio signals representative thereof, the one or more audio signals being provided to and stored in the memory device; and
   a speaker capable of outputting sound information based upon the one or more audio signals stored in the memory device.

21. A method of producing, on an electronic device, a virtual surface texture that to at least some extent replicates an external surface texture, the method comprising:
   receiving at the electronic device a texture input associated with the external surface texture;
   sending a first signal indicative of the texture input to a memory device on the electronic device;
   storing profile information based upon the first signal at the memory device;
   determining that a condition has occurred;
   providing a further signal based upon at least some of the profile information at least indirectly from the memory device to a first haptic component; and
   producing the virtual surface texture by way of the first haptic component, wherein the virtual surface texture is produced in response to the determining that the condition has occurred and based at least partly upon the further signal, whereby the virtual surface texture to at least some extent replicates the external surface texture.

22. The method of claim 21, wherein the texture input is received by way of the first haptic component, which serves as both a haptic sensor and a haptic actuator.

23. The method of claim 22, wherein the first haptic component is a piezoelectric device capable of operating as both the haptic sensor and the haptic actuator.

24. The method of claim 21, wherein the texture input is received by way of a second haptic component.

25. The method of claim 21, wherein additional texture inputs are received at the first haptic component, wherein additional signals indicative of the additional texture inputs are sent to the memory device, and wherein additional profile information based upon the additional signals is stored at the memory device.

26. The method of claim 25, further comprising one or more of:
- (a) selecting an appropriate portion of the profile information stored at the memory device upon determining that the condition has occurred, and basing the further signal upon the selected appropriate portion of the profile information;
- (b) filtering the first signal prior to the storing of the profile information based upon the first signal, wherein the filtering removes at least some signal frequency components that are impossible or difficult for a human being to sense; and
- (c) processing the stored profile information prior to the further signal being provided.

27. The method of claim 21, wherein one or more of the following is true:
- (1) the electronic device is a mobile device; and
- (2) the stored profile information is voltage profile information.

* * * * *